United States Patent Office 3,211,721
Patented Oct. 12, 1965

3,211,721
2,5-BIS-ETHYLENEIMINO-3,6-BIS-ENANTHOYL-
AMINO-p-BENZOQUINONE
Adrian Marxer, Muttenz, Switzerland, assignor to Ciba
Corporation, New York, N.Y., a corporation of
Delaware
No Drawing. Filed June 17, 1963, Ser. No. 288,449
Claims priority, application Switzerland, May 15, 1959,
73,254/59; Mar. 16, 1960, 2,966/60
1 Claim. (Cl. 260—239)

This is a continuation-in-part of my copending application Serial No. 26,718, filed May 4, 1960, and now abandoned.

This invention provides a new 2,5-bis-ethyleneimino-3,6 - bis-acylamino-para-benzoquinone. More especially it concerns 2,5-bis-ethyleneimino-3,6-bis-enanthoylamino-para-benzoquinone of the formula

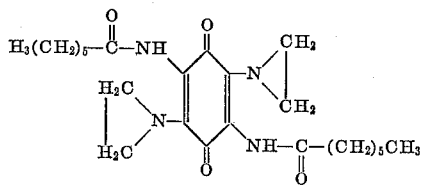

The new benzoquinone is active against amoebae, for example, against *Entamoeba histolytica*, and also against bacteria. When tested on animals e.g. on mice, it also exhibits a pronounced action in inhibiting the growth of tumours. It can therefore be used as tumour inhibiting agent. As regards this usefulness, it is superior to known compounds of comparable constitution and containing lower alkanoylamino radicals.

The new compound is obtained by reacting a 2,5-dihalogen - 3,6 - bis - enanthoylamino-para-benzoquinone with ethyleneimine. Among the dihalogen compounds there may be mentioned more especially the dichloro- and di-bromo compounds.

It is of advantage to work in an inert solvent, such as dioxane, benzene or in the presence of an alcohol, such as ethyl, isopropyl or butyl alcohol, or isopropyl ether.

In the reaction with ethylene imine there may also be used a condensing agent, such as a tertiary base. The reaction may be carried out at room temperature or a raised temperature.

The starting materials are known or can be made by methods in themselves known. The quinone of this invention can be used, for example, in the form of pharmaceutical preparations. These preparations contain the active compound in admixture or conjunction with a pharmaceutical organic or inorganic carrier suitable for enteral, parenteral or local administration. As carriers there are used substances which do not react with the new compounds, for example, gelatine, lactose, starches, magnesium stearate, talc, vegetable oils, benzyl alcohols, gums, polyalkylene glycols, white petroleum jelly, cholesterol or other carrier known for medicaments. The pharmaceutical preparations may be, for example in the form of tablets, dragees, powders, salves, creams, suppositories or in liquid form as solutions, suspensions or emulsions. If desired, they may be sterilized and/or may contain auxiliary substances, such as preserving, stabilizing, wetting or emulsifying agents. They may also contain other therapeutically valuable substances.

The following example illustrates the invention:

*Example*

81.7 grams of 2,5 - dichloro - 3,6 - bis-enanthoylamino-para-benzoquinone are suspended in 600 cc. of dioxane. A mixture of 29.2 cc. of ethyleneimine and 42 grams of triethylamine in 150 cc. of dioxane are slowly introduced dropwise at 25° C. and the crystal suspension that gradually becomes violet is stirred for 7 hours in a water bath at 45° C. The reddish reaction product is isolated by filtering with suction, then washed with ethanol, suspended in 700 cc. of water and the suspension is filtered with suction, and the filter residue is washed with ethanol and dried.

The 2,5 - bis-enanthoyl-3,6-bis-ethyleneimino-para-benzoquinone so obtained melts at 208–210° C. with decomposition. Recrystallization from a large amount of alcohol brings the melting point up to 219–221° C.

The 2,5 - dichloro - 3,6-bis-enanthoylamino-para-benzoquinone used as starting material is obtained in the following manner:

1 cc. of concentrated sulfuric acid is added to 31.0 grams of 2,5-dichloro-3,6-diamino-para-benzoquinone and 100 grams of enanthic acid anhydride, and the whole is stirred for 7 hours in a water bath at 75° C. A further 0.5 cc. of concentrated sulfuric acid is then added and the whole is stirred for a further 6 hours in the water bath at 75° C. The originally brown suspension becomes yellow. While cooling with ice there are slowly added 100 cc. of alcohol, the crystals are isolated by filtering with suction and then recrystallized from 2.5 liters of glacial acetic acid. The product melts at 225–230° C.

What is claimed is:

2,5 - bis - ethyleneimino - 3,6-bis-enanthoylamino-para-benzoquinone.

References Cited by the Examiner
UNITED STATES PATENTS
2,802,001   8/57   Marxer _____ 260—239

FOREIGN PATENTS
196,389   3/58   Austria.
247,167   4/60   Australia.

OTHER REFERENCES

Moroney: Facts From Figures (Pelican Book A236) (London, 1956), pages 4–7.

IRVING MARCUS, *Primary Examiner.*

WALTER A. MODANCE, *Examiner.*